Patented Feb. 19, 1946

2,395,041

UNITED STATES PATENT OFFICE 2,395,041

BITUMINOUS COMPOSITION AND PROCESS OF MANUFACTURING THE SAME

William F. Fair, Jr., Pittsburgh, Pa., assignor, by mesne assignments, to Koppers Company, Inc., a corporation of Delaware No Drawing. Application December 3, 1942, Serial No. 467,814

16 Claims. (Cl. 196—14)

The present invention relates to improvements in bituminous compositions and processes of preparing the same. More particularly the invention relates to the preparation of certain bituminous compositions which are greatly improved in regard to viscosity susceptibility to temperature change, and which have preferred rheological properties, rendering them outstandingly suitable for customary construction purposes and for many new uses, without adversely affecting their well recognized excellent weather-resistant properties.

Bituminous products have long been used in coating compositions and in binders. In general it has been found that most of the various tars and pitches commonly used behave over the normal range of atmospheric temperatures as purely viscous liquids, as judged by their shearing stress-rate of shear relations over wide ranges of shearing stress. The bituminous compositions and the products manufactured by the processes herein described differ from these commonly used tars and pitches in that they have better temperature susceptibilities, that is, less change in viscosity with temperature change, and exhibit non-viscous or non-Newtonian flow at atmospheric temperatures, when submitted to shearing-stresses, as well as definite plasticity and little tendency toward embrittlement at relatively low temperatures, while retaining the desirable water and light resistant properties typical of tar products in general, as demonstrated by extended accelerated aging tests and outdoor exposure tests, and by accumulated service data and observations made during actual experience.

An object of the present invention is to provide a bituminous composition of a highly improved type, which in itself has the property of adhering tenaciously to smooth as well as rough surfaces, and yet after application exhibits less tendency to flow at relatively high temperatures and little tendency toward embrittlement at reduced temperatures, as contrasted with comparably specified grades of similar materials formerly used, together with the excellent weather-resistant characteristics mentioned above.

Another object is to provide a process of preparing the improved bituminous composition and particularly a process whereby compositions of certain desirable characteristics are uniformly obtained.

The composition hereinafter described and claimed comprises coal dispersed by controlled digestion in a heat-liquefiable bituminous medium which is composed of, or contains, heavy water gas tar heavy oil, or to which heavy water gas tar heavy oil is added during or after the digestion and dispersion process, or during or after thermal decomposition of coal in such process. In one procedure, coal and tar or pitch are heated together and, while stirring the mixture, the temperature thereof is gradually increased over an extended period of time to substantially 300° C. or preferably to a temperature in the approximate range of 300° C. to 310° C. Any distillate obtained is discarded. The heated material is fluxed to any required softening point with heavy water gas tar heavy oil to obtain the desired improved bituminous product.

In an alternative procedure, coal, and tar or pitch, and heavy water gas tar heavy oil are initially thoroughly mixed, heated together and while mixing, the temperature is gradually raised over a period of time to obtain a product having a desired softening point. In another procedure, though not as desirable as those indicated above, coal is dispersed in heavy water gas tar heavy oil, and tar or pitch are then added while heating and stirring. During or after a period of gradually increasing temperature, depending upon the proportions of materials originally combined, additional quantities of pitch or tar or heavy water gas tar heavy oil, or combinations of these are added as necessary to obtain a product having any desired softening point over the approximate range of 35° C. to 150° C. and exhibiting improved rheological properties.

The above processes are varied depending upon the coal and tar or pitch used and upon the nature of the product to be obtained. The coal is a bituminous coal such as, coking coals including either high or low volatile bituminous coal, and certain commercial non-coking bituminous coals.

Highly improved results are definitely and particularly obtained by using for the tar or pitch constituent heavy water gas tar or a pitch residue derived from the distillation of heavy water gas tar. Heavy water gas tar is obtained from water-gas generator plants in which Bunker-C or similar grades of residual petroleum fuel oil are used for carburetting. This tar, though produced from a petroleum raw material, is composed mostly of aromatic constituents. Heavy water gas tar should be differentiated from what is known as water gas tar or light water gas tar which is produced in the carburetter of a water gas plant when petroleum distillates are used as carburetting materials. In certain industrial groups heavy water gas tar is termen residuum tar to distinguish it from what was formerly known as water gas tar or is known today as light water gas tar. Other heat-liquefiable bitumens including tars and pitches, either singly or combinations thereof, may be added to the heavy water gas tar, or may be substituted in whole or in part for the latter. Other bitumens in addition to heavy water gas tar are, for example, coal tar (from high or low temperature coking processes) water-gas tar, oil-gas tar, Pintsch gas tar and wood tar, and the corresponding pitches derived from the above-mentioned tars.

The heavy water gas tar heavy oil, or high boiling distillate, which is included in the digested coal product, or what is known as coal dispersion pitch, and which lowers the susceptibility of the viscosity of the product to change with temperature, is obtained by distilling heavy water gas tar and separating the distillate recoverable above approximately 300° C. during the increasing temperature interval when samples of the distillation pitch residue increase in softening point from approximately 95° C. to approximately 150° C., as measured by the A. S. T. M. standard Ring and Ball softening point test. Only a minor portion of said oil thus prepared will boil below 300° C. Typical distillation results obtained at atmospheric pressure for a sample of heavy water gas tar heavy oil so prepared are given in the following table:

| Temperature | Per cent distillate |
| --- | --- |
| 270° C | 3.9 |
| 300° C | 15.8 |
| 355° C | 68.9 |
| 375° C | 82.6 |
| 400° C | 92.9 |

By means of the materials employed, products are prepared of relatively high softening points, having relatively high penetration characteristics at low temperatures, and high yield values when subjected to shearing stress, or in other words increased resistance to flow, at atmospheric temperatures. It is found that additional improvement in lowered change of viscosity with change of temperature, particularly and definitely is the case in the manufacture of products of the type herein described, which contain heavy water gas tar heavy oil. Though bituminous products made from coal, tar, and oil have heretofore been proposed, the product of the present invention is in many important respects markedly superior. That the susceptibility of change in viscosity to change in temperature is considerably improved is amply demonstrated by the softening point determinations and the standard penetration test results at different temperatures for the various examples of the pitches presented hereinbelow. As a basis for the empirical evaluation of the improvement of this property shown by the examples cited, typical softening point and penetration characteristics are given in the table below for a straight distilled coke oven tar pitch, a straight distilled heavy water gas tar pitch, and a coal dispersed pitch prepared from coal, coke oven tar, and coke oven tar heavy oil.

| | S. pt. (R & B) | Penetration | | |
| --- | --- | --- | --- | --- |
| | | 200 g., 60 sec. 32° F. | 100 g., 5 sec. 77° F. | 50 g., 5 sec. 115° F. |
| Straight distilled coke oven pitch | °C. 75 | 0 | 0 | 17 |
| Straight distilled heavy water gas tar pitch | 73 | 0 | 0 | 20 |
| Coal dispersed coke oven tar-coke oven tar heavy oil pitch | 75 | 3 | 15 | 65 |

That the rheological properties of products of the type hereinafter described have been substantially improved may be demonstrated by observation of recovery after deformation upon removal of the stress causing movement of the improved pitch and by the fact that instead of obeying the laws of viscous or Newtonian flow, these materials after application and setting will not flow off of vertical or slanting surfaces at atmospheric temperatures, and definitely exhibit high yield values and non-viscous or non-Newtonian flow characteristics. These bituminous products remain in place also at temperatures approaching their softening points when applied in thin films, and they are not brittle at relatively low atmospheric temperatures.

When heating the bituminous plastic product to melt it, or to apply it in a hot liquid state, the fumes therefrom are found to be less irritating to the skin or eyes of the workmen than some of the bituminous materials customarily used heretofore, which is of considerable advantage from the standpoint of efficient application. In coating metal, stone, or wooden structures or any smooth surface, no priming coat is usually necessary. The molten product can be applied directly to the bare surfaces. On such structures as flat or corrugated metal sheets, pipes, or wires or articles having rounded surfaces or sharp corners, little or no peeling takes place as is the case in other coating compositions particularly after weathering.

Sheets or coatings or structural products protected with bituminous products of the present invention withstand the effects of intensive accelerated aging tests. It has been demonstrated that they are highly inert to the action of light (ultra violet and other rays), atmospheric high and low temperatures, relatively sudden atmospheric temperature changes, and water (including rain water). In outdoor exposure tests over long periods of time and with temperatures ranging as high as over 130° F., no signs of flowing of coatings on metal panels were observed.

These products, though strongly adhesive, do not present a sticky outer surface at atmospheric temperatures. Though they may be rendered hard, they do not fracture easily, and even at low or freezing temperatures they exhibit little tendency toward embrittlement. Drop tests show that coatings of these materials exhibit little or no tendency to chip off or shatter on impact at temperatures as low as freezing temperatures. The products find wide use, therefore, in linings and outer protective coatings of pipes and as a substitute for galvanizing zinc on steel or iron articles of various shapes.

Further uses requiring moderate to high melting points are in binders including battery box, clay mastic and shingle binders; linings for pipes and tanks; certain coatings for metal surfaces and for saturated felt; bases for roof cements, column cements, adhesives (such as cut back mastic for non-metallic flashings), and as bases for crack fillers or joint fillers and for cold application fluid bituminous cements of various types. Other uses are in battery box compositions, electrical insulations and seals, extenders for resins and for rubber etc., wherein very high melting bitumen material of low viscosity susceptibility to temperature change is needed. Still further uses requiring lower melting point products are found in high consistency hot application road tars, in bases for more fluid road tars and in certain binders for waterproofing compounds such as clay mastics. The melting or softening point characteristics of the products claimed may be readily adjusted to meet the needs of the wide variety of applications by appropriate variation of the relative proportions of the ingredients and the method of processing.

In accomplishing the above purposes, it is found that in the preparation of the products claimed, products with the desired characteristics may be duplicated by adjustment of the proportions of coal, dispersing media and heavy water gas tar heavy oil; by control of heating temperatures; by addition of dispersing media and/or heavy water gas tar heavy oil to a batch under treatment at predetermined stages in the coal digestion process and at predetermined rates; by adjustment of the length of time of mixing and heating given proportions of the ingredients and of the manner of mixing same; and, if desired, by alternative treatments of the coal dispersion products with dehydrogenating agents such as sulfur, and/or air or oxygen-containing gases, or by vacuum distillation of the coal dispersion product and subsequent addition of heavy water gas tar heavy oil, thereby replacing lower boiling oils by the higher boiling heavy water gas tar heavy oil.

In the preparation of the digested coal product, the ingredients are placed in a still or digesting tank provided with or without mechanical stirrers or other means of agitation and provided with heating means. In large scale production a still, provided with heating tubes positioned so as to distribute heat uniformly throughout a batch, may be used. The rate of rise in temperature of the heating vessel in the initial stages at least is preferably low to permit the evaporation of any water present which might cause excessive foaming. The coal used may be preferably initially dehydrated which is best accomplished by finely dividing it and then subjecting it to a drying treatment. By proper division of the coal to a finely pulverized condition more uniform distribution thereof in the liquid media is readily attained. Coking of the material or too rapid decomposition of constituents therein, particularly where the higher concentrations of coal are employed, is avoided by maintaining moderate rates of temperature rise.

The temperature at which coal and a bituminous medium are heated together to provide the product of the present invention should not be lower than that at which a satisfactory dispersion is obtained within a reasonable time from a practical standpoint, namely, substantially 270° C., and the temperature should not be permitted to rise so high as to decrease unduly the life of the heating equipment, namely, approximately 350° C.

In adjusting the characteristics of the final product, it is noted that generally the increase in proportion of coal results in more pronounced departure from simple viscous flow properties, and in increased softening points of the products. The greater the proportion of dispersed coal, the harder the final product, and the greater the proportion of admixed heavy water gas tar heavy oil the softer the product and the greater the improvement in temperature susceptibility. The greater the proportion of the coal and heavy water gas tar heavy oil as distinct from tar or pitch, the better the improvements in viscosity-temperature susceptibility and the greater the resistance to flow under stress. The addition of heavy water gas tar heavy oil alone to a bitumen such as coal tar pitch as well as to coal and tar or oil mixtures, and the uniform distribution of the heavy water gas tar heavy oil therein, result in a homogeneous product having a relatively lower viscosity susceptibility to temperature changes than does the original bitumen.

The penetration tests in each of the examples provided below were determined according to A. S. T. M. procedure under the following conditions: at 32° F., 200 grams, 60 seconds; at 77° F., 100 grams, 5 seconds; and at 115° F., 50 grams, 5 seconds. The softening points are determined in accordance with the A. S. T. M. Ring and Ball methods.

Since the normal grades of road tar binders are too low in viscosity for evaluation of flow properties or improvements thereof by the tests used for the higher melting pitches, it is convenient to use as a numerical index of their viscosity-temperature susceptibilities the mathematical definition given by the equation, $$S = 0.221 \left[ \frac{\log \frac{\log (u_1)}{\log (u_2)}}{\log \frac{T_2}{T_1}} \right]$$

where $u$ is the kinematic viscosity in centistokes, and $T$ is the absolute temperature. Expressed non-mathematically, the above value of the temperature susceptibility is the slope of a line obtained by plotting viscosities at two temperatures on A. S. T. M. chart D-341-32T, on which log log viscosities may be easily plotted against log absolute temperature.

For comparison with such examples presented below which illustrate more specifically the production of road tars of improved temperature susceptibilities, it has been found that many known road tars of the viscosity ranges customarily used have viscosity-temperature susceptibilities of from 1.1 to 1.2, as defined above. The examples given below therefore illustrate the definite improvement in lowered temperature susceptibility typical of the products made by this invention.

The products of the present invention and the procedures for making them are more specifically set forth in the following illustrative examples:

Example 1.—About 187 parts by weight of heavy water gas tar and about 47 parts by weight of powdered bituminous coal are heated together in a still preferably while stirring. The temperature is gradually raised to a temperature of about 305° C. over a period of approximately five and one-half hours. This temperature is maintained for about four hours during which time there results a distillate of about 5 to 6% based on the tar. At the end of this time heating is discontinued and the mixture permitted to cool. After about forty minutes and while the temperature is slowly dropping, about 54 parts by weight of heavy water gas tar heavy oil are stirred into the heat-treated coal and tar mass. The resulting product is discharged from the still at around 225° C. The softening point of this product is about 102° C., and the penetration at 32° F. is 14; at 77° F. is 20.5; and at 115° F. is 40.

Example 2.—A still is charged with about 60 parts by weight of heavy water gas tar heavy oil to which about 37.5 parts by weight of powdered coking coal are added, and then about 52.5 parts by weight of coke oven tar pitch, while stirring and heating. The charge is preferably heated slowly to a temperature of about 300° to 310° C. This range is reached in about two and one-half hours and is substantially maintained for about five hours. The temperature of the charge at the end of another hour is reduced to about 245° C. and about 22 parts by weight of heavy water gas tar heavy oil added while stirring. At two successive intervals thereafter of about thirty minutes apart, about 10 parts by weight of coke oven pitch are added while stirring. The product is discharged from the still and is ready for use. Its softening point is about 104° C. and the penetration at 32° F. is 15; at 77° F. is 25; and at 115° F. is 40.

*Example 3.*—A still is charged with about 4770 gallons of heavy water gas tar at about 60° F., about 13,200 pounds of pulverized bituminous coal, and about 1450 gallons of heavy water gas tar heavy oil. The charge is then slowly heated to about 300° C. over a period of about twelve hours and is maintained at this temperature for an additional two to four hours. Tests are made on softening point and penetrations and the material is discharged from the still and barreled. A typical sample has a softening point of 112° C. and penetrations at 32° F. of 15; at 77° F. of 22; and at 115° F. of 40.

*Example 4.*—About 69 parts by weight of heavy water gas tar, about 69 parts by weight of coke oven tar and substantally 45 parts by weight of powdered coking coal are brought together and heated slowly to 300° C. over a period of about three to four hours. The temperature is maintained at about 300° C. for an additional three to four hours whereafter substantially 73 parts by weight of heavy water gas tar heavy oil are added. After introduction of the oil the heating is discontinued and the resulting product is permitted to cool. The softening point of the product is substantially 103.2° C., and the penetration at 32° F. is 29; at 77° F. is 36; and at 115° F. is 60.

*Example 5.*—About 40 parts by weight of pulverized bituminous coal that has been previously dried, are mixed with about 120 parts by weight of heavy water gas tar. The mixture is heated and the temperature gradually brought up to about 300° C. over a period of three to four hours. This temperature is maintained for an additional four hours when heating is discontinued and about one hour later about 62 parts by weight of heavy water gas tar heavy oil are added. The resulting material is allowed to cool and is discharged from the still in liquid form. The product has a softening point of about 104.5° C., and penetrations at 32° F. of 18; at 77° F. of 28; and at 115° F. of 45.

*Example 6.*—A mixture of about 40 parts by weight of dried pulverized bituminous coal and 120 parts by weight of heavy water gas tar are heated slowly over a period of about five hours up to a temperature of about 300° C. For an additional four hours the temperature of the mixture is maintained within the range of about 300 to 310° C. During the heating about 9% of the material based on the tar is distilled off, and rejected. The heating is discontinued and after about forty minutes 80 parts by weight of heavy water gas tar heavy oil are thoroughly stirred in and uniformly distributed in the mixture. The resulting product is permitted to cool. The product has a softening point of about 111.5° C., and penetrations at 32° F. of 31; at 77° F. of 46; and at 115° F. of 80.

*Example 7.*—60 parts by weight of coke oven tar and 15 parts by weight of powdered bituminous coal are brought together and heated over a period of about three hours to a temperature of about 305° C. The heating is continued at about this temperature for an additional six hours. At the end of this period about 14% by weight of heavy water gas tar heavy oil based on the weight of the heated material is added, distributed therein, and the heating is discontinued. The product has a softening point of about 74° C., and penetrations at 32° F. of 12; at 77° F. of 27; and at 115° F. of 72.

By way of comparison, a product prepared from substantially the same proportions of coke oven tar, powdered bituminous coal and coke oven tar heavy oil and under substantially similar conditions as in Example 7, is a product having a softening point of about 74° C., and penetrations at 32° F. of 3.5; at 77° F. of 14.0; at 115° F. of 63.0. Thus the latter product is considerably more susceptible to changes in temperature than the product of Example 7 in which heavy water gas tar heavy oil is substituted for coke oven tar heavy oil. Example 8 also illustrates the improvement effected by use of heavy water gas tar heavy oil in a coal dispersion coke oven tar pitch.

*Example 8.*—A mixture prepared from approximately 174 parts by weight of coke oven tar and approximately 58 parts by weight of pulverized bituminous coal is heated to about 300° C. over a period of seven to eight hours. The heating is discontinued and about 72 parts by weight of heavy water gas tar heavy oil are added whereupon the heating is resumed at about 300° C. for an additional one to two hours. Then another 15 parts by weight of heavy water gas tar heavy oil are added whereafter the heating is discontinued and after thorough mixing the product is permitted to cool. The softening point of the product is about 89° C. and the penetration at 32° F. is 24; at 77° F. is 38; and at 115° F. is 67.

*Example 9.*—Approximately 31 parts by weight of pulverized bituminous coal and about 125 parts by weight of heavy water gas tar are heated together to a temperature in the range of approximately 300 to 310° C. within a period of four to five hours. The heating in this range is continued for an additional four hours. Then the heating is discontinued for about forty-five minutes whereupon approximately 48 parts by weight of heavy water gas tar heavy oil are thoroughly mixed into the heated mixture. The product is permitted to cool and is found to have a softening point of about 83.3° C., and penetrations at 32° F. of 21; at 77° F. of 40; and at 115° F. of 95.

*Example 10.*—60 parts by weight of heavy water gas tar and 15 parts by weight of powdered bituminous coal are heated together to a temperature of about 300° C. over a period of two to three hours. For an additional three hours the temperature of the mixture is maintained at about 300° C. The mixture is permitted to cool to around 250° C. and air is introduced and thoroughly distributed in the mixture for about one hour. The introduction of the air is then stopped to prevent too great an increase in temperature. After sufficient cooling the introduction of air is resumed and continued for about thirty-five minutes. During this time the temperature is held as near as possible at about 250° C. After the introduction of air which raises the softening point of the heated material from 120° C. to about 150°

C., about 32% by weight (based on the heated material) of heavy water gas tar heavy oil is added and the heating continued for about one hour. The resulting product has a softening point of about 85.5° C., and penetrations at 32° F. of 14.0; at 77° F. of 27.0; and at 115° F. of 63.0.

*Example 11.*—A mixture of approximately 59 parts by weight of heavy water gas tar, 1 to 2 parts by weight of sulfur, and 16 parts by weight of powdered bituminous coal is heated to about 305° C. over a period of about four hours. The heating at this temperature is continued for an additional three hours. After another one or two hours about 34 parts by weight of heavy water gas tar heavy oil are thoroughly mixed with the heated material. The mixture is permitted to cool. The product has a softening point of about 112.5 C., and penetrations at 32° F. of 34; at 77° F. of 52; and at 115° F. of 104.

*Example 12.*—A mixture of about 15 parts by weight of powdered bituminous coal, 58 parts by weight of coke oven tar and 1 to 2 parts by weight of sulfur is heated to a temperature in the range of 300 to 310° C. over a period of about three hours. The temperature is held within this range for an additional four to five hours. At the end of the latter period about 22 parts by weight of heavy water gas tar heavy oil are added, the heating is discontinued and the material thoroughly stirred. At the end of about three hours the product is sufficiently cool for further handling. The product has a softening point of about 81.5° C., and penetrations at 32° F. of 26; at 77° F. of 38; and at 115 F. of 79.

*Example 13.*—80 parts by weight of heavy water gas tar and 20 parts of pulverized coal are mixed and slowly heated during four hours to 300° C., maintained at 300 to 310° C. for an additional four hours, removing approximately 11% by weight (on the basis of the tar present) of distillate which is rejected. Vacuum is then applied to the system which effects the removal of about 7% additional distillate from the tar, producing a pitch residue having a softening point of 137° C. Incorporation of 36% of heavy water gas tar heavy oil (on the basis of the remaining combined heated materials) produces a bitumen having a softening point of about 83° C., and penetrations of 36 at 32° F.; 65 at 77° F.; and 130 at 115° F.

*Example 14.*—170 parts by weight of heavy water gas tar and 17 parts of pulverized coal are mixed and heated slowly during five hours to 300° C., and maintained at 300° C. for two hours. 60 parts of heavy water gas tar heavy oil are then introduced, the mixture is agitated and allowed to cool. This product, having a consistency equivalent to that of a road tar of RT–10 grade, is found to have a softening point of about 26° C. At 35° C. the viscosity of this road binder is 77,500 centistokes while at 50° C. its viscosity is 10,100 centistokes, from which a viscosity-temperature susceptibility of 0.93 may be calculated.

*Example 15.*—200 parts by weight of coke oven coal tar and 20 parts of pulverized coal are intimately mixed and slowly heated during four hours to a temperature of 300° C., and maintained at 300° C. for five hours, after which 43 parts of heavy water gas tar heavy oil are added, and the mixture allowed to cool while being stirred. This product equivalent to a road tar of RT–10 grade, is found to have a viscosity of 214,400 centistokes at 35° C., and a viscosity of 17,230 centistokes at 50° C., from which a viscosity-temperature susceptibility of 1.07 is established.

What is claimed is:

1. In a bituminous product, a plastic composition consisting of coal-digestion pitch containing heavy water gas tar heavy oil derived from heavy water gas tar obtained in carburetting a gas with residual petroleum fuel oil in a water-gas generator plant, the said heavy water gas tar heavy oil having a distillation range between about 270° C. and about 400° C.

2. In a bituminous product, a plastic composition consisting of coal-digestion pitch containing heavy water gas tar heavy oil derived from heavy water gas tar obtained in carburetting a gas with residual petroleum fuel oil in a water-gas generator plant, the said coal-digestion pitch resulting from thermal digestion of bituminous coal in a temperature range of substantially 300° to 310° C. in a heat-liquefiable bitumen and from uniform dispersion of said digested coal in said bitumen and said heavy water gas tar heavy oil.

3. In a bituminous product, a plastic composition consisting of coal-digestion pitch containing heavy water gas tar heavy oil derived from heavy water gas tar obtained in carburetting a gas with residual petroleum fuel oil in a water-gas generator plant, the said coal-digestion pitch resulting from thermal digestion of bituminous coal in a temperature range of substantially 300° to 310° C. in tar and from uniform dispersion of said digested coal in said tar and said heavy water gas tar heavy oil.

4. In a bituminous product, a plastic composition consisting of coal-digestion pitch containing heavy water gas tar heavy oil derived from heavy water gas tar obtained in carburetting a gas with residual petroleum fuel oil in a water-gas generator plant, the said coal-digestion pitch resulting from thermal digestion of bituminous coal in a temperature range of substantially 300° to 310° C. in heavy water gas tar and from uniform dispersion of said digested coal in said heavy water gas tar and said heavy water gas tar heavy oil.

5. In a bituminous product, a plastic composition consisting of coal-digestion pitch containing heavy water gas tar heavy oil derived from heavy water gas tar obtained in carburetting a gas with residual petroleum fuel oil in a water-gas generator plant, the said coal-digestion pitch resulting from thermal digestion of bituminous coal in a temperature range of substantially 300° to 310° C. in heavy water tar gas pitch and from uniform dispersion of said digested coal in said heavy water gas tar pitch and said heavy water gas tar heavy oil.

6. In a bituminous product, a plastic composition consisting of a coal-digestion pitch containing heavy water gas tar heavy oil derived from heavy water gas tar obtained in carburetting a gas with residual petroleum fuel oil in a water-gas generator plant, the said coal-digestion pitch resulting from thermal digestion of bituminous coal in a temperature range of substantially 300° to 310° C. in coal tar and from uniform dispersion of said digested coal in said coal tar and said heavy water gas tar heavy oil.

7. In a bituminous product, a plastic composition consisting of coal-digestion pitch containing heavy water gas tar heavy oil derived from heavy water gas tar obtained in carburetting a gas with residual petroleum fuel oil in a water-gas generator plant, the said coal-digestion pitch with a melting point in the range of 35° C. to 150°

C. having relatively high penetration at low atmospheric temperature, 32° F., as well as relatively low penetration at high atmospheric temperature, 115° F., and having a relatively high softening point with the said penetrations at 32° F. and at 115° F.

8. In a bituminous product, a plastic composition consisting of coal-digestion pitch containing heavy water gas tar heavy oil derived from heavy water gas tar obtained in carburetting a gas with residual petroleum fuel oil in a water-gas generator plant, the said coal-digestion pitch with a melting point in the range of 35° C. to 150° C. having relatively high penetration at low atmospheric temperature, 32° F., as well as relatively low penetration at high atmospheric temperature, 115° F., and having a relatively high softening point with the said penetrations at 32° F. and at 115° F., and exhibiting no flow from vertical surfaces at atmospheric temperatures above 130° F.

9. In a bituminous product, a plastic composition consisting of coal-digestion pitch containing heavy water gas tar heavy oil derived from heavy water gas tar obtained in carburetting a gas with residual petroleum fuel oil in a water-gas generator plant, the said heavy water gas tar heavy oil being a distillate from said heavy water gas tar recoverable above approximately 300° C., and the said coal-digestion pitch with a melting point in the range of 35° C. to 150° C. having relatively high penetration at low atmospheric temperature, 32° F., as well as relatively low penetration at high atmospheric temperature, 115° F., and having a relatively high softening point with the said penetrations at 32° F. and at 115° F.

10. In a bituminous product, a plastic composition consisting of coal-digestion pitch resulting from thermal digestion of bituminous coal in a temperature range of substantially 270° C. to approximately 350° C. in a heat-liquefiable bitumen and from uniform dispersion of said digested coal in said bitumen and heavy water gas tar heavy oil derived from heavy water gas tar obtained in carburetting a gas with residual petroleum fuel oil in a water-gas generator plant.

11. In a bituminous product, a plastic composition consisting of coal-digestion pitch resulting from thermal digestion of bituminous coal in a temperature range of substantially 270° C. to approximately 350° C. in a heat-liquefiable bitumen and from uniform dispersion of said digested coal in said bitumen and heavy water gas tar heavy oil derived from heavy water gas tar obtained in carburetting a gas with residual petroleum fuel oil in a water-gas generator plant, the said coal-digestion pitch with a melting point in the range of 35° C. to 150° C. having relatively high penetration at low atmospheric temperature, 32° F., as well as relatively low penetration at high atmospheric temperature, 115° F., and having a relatively high softening point with the said penetrations at 32° F. and at 115° F.

12. In a bituminous product, a plastic composition consisting of coal-digestion pitch containing heavy water gas tar heavy oil derived from heavy water gas tar obtained in carburetting a gas with residual petroleum fuel oil in a water-gas generator plant, the said heavy water gas tar heavy oil being a distillate from said heavy water gas tar recoverable above approximately 300° C., and the said coal-digestion pitch resulting from thermal digestion of bituminous coal in a temperature range of substantially 300° to 310° C. in tar and from uniform dispersion of said digested coal in said tar and said heavy water gas tar heavy oil.

13. In a bituminous product, a plastic composition consisting of coal-digestion pitch containing heavy water gas tar heavy oil derived from heavy water gas tar obtained in carburetting a gas with residual petroleum fuel oil in a water-gas generator plant, the said heavy water gas tar heavy oil being a distillate from said heavy water gas tar recoverable above approximately 300° C., the said coal-digestion pitch resulting from thermal digestion of bituminous coal in a temperature range of substantially 300° to 310° C. in tar and from uniform dispersion of said digested coal in said tar and said heavy water gas tar heavy oil, the said coal-digestion pitch with a melting point in the range of 35° C. to 150° C. having relatively high penetration at low atmospheric temperature, 32° F., as well as relatively low penetration at high atmospheric temperature, 115° F., and having a relatively high softening point with the said penetrations at 32° F. and at 115° F., and exhibiting no flow from vertical surfaces at atmospheric temperatures above 130° F.

14. In a bituminous product, a plastic composition consisting of coal-digestion pitch resulting from thermal digestion of bituminous coal in a temperature range of substantially 270° C. to approximately 350° C. in a heat-liquefiable bitumen and from uniform dispersion in said bitumen and heavy water gas tar heavy oil derived from heavy water gas tar obtained in carburetting gas with residual petroleum fuel oil in a water-gas generator plant, the said composition having a viscosity-temperature susceptibility of below 1.1 calculated from the expression $$S = 0.221 \frac{\log \frac{\log (U_1)}{\log (U_2)}}{\log \frac{T_2}{T_1}}$$

wherein $U_1$ and $U_2$ are the kinematic viscosities in centistokes at the absolute temperatures $T_1$ and $T_2$ respectively.

15. In a method of preparing a coal-digestion pitch product, the steps of first thermally digesting bituminous coal in a heat-liquefiable bitumen in a temperature range of about 270° C. to approximately 350° C. and then stirring into the resulting digested coal mass heavy water gas tar heavy oil derived from heavy water gas tar obtained in carburetting a gas with residual petroleum fuel oil in a water-gas generator plant.

16. In a method of preparing a coal-digestion pitch product, the steps of first thermally digesting bituminous coal in a heat-liquefiable bitumen in a temperature range of about 270° C. to approximately 350° C. and in the presence of a dehydrogenating agent selected from the group consisting of sulfur and oxygen, and then stirring into the resulting digested coal mass heavy water gas tar heavy oil derived from heavy water gas tar obtained in carburetting a gas with residual petroleum fuel oil in a water-gas generator plant.

WILLIAM F. FAIR, Jr.